(12) United States Patent
Shapoury et al.

(10) Patent No.: US 11,401,051 B2
(45) Date of Patent: Aug. 2, 2022

(54) AIRCRAFT INSPECTION SYSTEMS AND METHODS

(71) Applicant: THE BOEING COMPANY, Chicago, IL (US)

(72) Inventors: Alireza Shapoury, Rancho Palos Verdes, CA (US); James J. Troy, Issaquah, WA (US); Gary Georgeson, Tacoma, WA (US); Branko Sarh, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 707 days.

(21) Appl. No.: 15/898,724

(22) Filed: Feb. 19, 2018

(65) Prior Publication Data

US 2019/0256226 A1  Aug. 22, 2019

(51) Int. Cl.
*B64F 5/60* (2017.01)
*G06T 7/521* (2017.01)
*G06T 7/00* (2017.01)
*G05D 1/00* (2006.01)
*G05D 1/02* (2020.01)
(Continued)

(52) U.S. Cl.
CPC ............... *B64F 5/60* (2017.01); *B60L 53/30* (2019.02); *G05D 1/0094* (2013.01); *G05D 1/028* (2013.01); *G06T 7/001* (2013.01); *G06T 7/521* (2017.01); *G06T 7/73* (2017.01); *G07C 5/008* (2013.01); *G07C 5/0841* (2013.01); *G05D 1/024* (2013.01); *G05D 1/0257* (2013.01); *G05D 2201/0207* (2013.01); *G06T 2207/10028* (2013.01); *G06T 2207/10048* (2013.01); *G06T 2207/30248* (2013.01)

(58) Field of Classification Search
CPC .. G07C 2205/02; G07C 5/0841; G07C 5/008; B64F 5/60; G05D 2201/0207; G05D 1/0094; G05D 1/028; G05D 1/0257; G05D 1/024; B60L 53/30; G06T 7/521; G06T 7/001; G06T 7/73; G06T 2207/10028; G06T 2207/10048; G06T 2207/30248
See application file for complete search history.

(56) References Cited

U.S. PATENT DOCUMENTS 7,859,655 B2  12/2010 Troy
8,666,546 B2  3/2014 Sarh
(Continued)

OTHER PUBLICATIONS

Https://en.wikipedia.org/wiki/Air-Cobot.
U.S. Appl. No. 15/623,304, filed Jun. 14, 2017.
U.S. Appl. No. 15/878,642, filed Jan. 24, 2018.

*Primary Examiner* — Abby Y Lin
*Assistant Examiner* — Renee LaRose
(74) *Attorney, Agent, or Firm* — The Small Patent Law Group LLC; Joseph M. Butscher

(57) ABSTRACT

An aircraft inspection system is configured to inspect one or more components of an aircraft before a flight. The aircraft inspection system includes an inspection robot that is configured to inspect the component(s) of the aircraft. The inspection robot includes a conveying sub-system that is configured to efficiently move the inspection robot to different locations, and a sensing sub-system including one or more sensors that are configured to sense one or more characteristics of the component(s) during an inspection. The sensing sub-system is configured to record the characteristic(s) as inspection data.

49 Claims, 8 Drawing Sheets

(51) Int. Cl.
*G07C 5/08* (2006.01)
*G07C 5/00* (2006.01)
*G06T 7/73* (2017.01)
*B60L 53/30* (2019.01)

(56) References Cited

U.S. PATENT DOCUMENTS

| | | | |
|---|---|---|---|
| 8,713,998 B2 | 5/2014 | Troy | |
| 9,505,494 B1* | 11/2016 | Marlow | B64C 39/024 |
| 2010/0235037 A1* | 9/2010 | Vian | G07C 5/0808 |
| | | | 701/31.4 |
| 2013/0231779 A1* | 9/2013 | Purkayastha | B25J 9/1697 |
| | | | 700/259 |
| 2013/0292512 A1* | 11/2013 | Erben | G01N 1/2273 |
| | | | 244/1 R |
| 2016/0364989 A1* | 12/2016 | Speasl | B64F 1/222 |
| 2017/0015151 A1* | 1/2017 | Bill | B60C 23/0457 |
| 2017/0139045 A1* | 5/2017 | Cherepinsky | B64D 45/0005 |
| 2017/0293034 A1* | 10/2017 | Otsubo | G01S 19/31 |
| 2017/0355081 A1* | 12/2017 | Fisher | H04N 5/33 |
| 2019/0137995 A1* | 5/2019 | Tan | G05D 1/0022 |

* cited by examiner

AIRCRAFT INSPECTION SYSTEMS AND METHODS

FIELD OF EMBODIMENTS OF THE DISCLOSURE

Embodiments of the present disclosure generally relate to aircraft inspection systems and methods, such as may be used to inspect an aircraft prior to a flight.

BACKGROUND OF THE DISCLOSURE

Aircraft are used to transport individuals and/or cargo between various locations for various reasons. Before an aircraft departs an airport, a pilot and/or ground crew walk around the aircraft to perform numerous visual inspections of various components of the aircraft. For example, individuals visually inspect engines, control surfaces, landing gear, and/or the like to ensure that components of the aircraft are properly functioning, as well as to address required safety inspection procedures.

Pre-flight, walk-around inspections include visual inspection of intake areas of engines (in order to determine if dents or other such damage are present). Further, individuals inspect for ice accumulation in or on various components (such as engines, control surfaces, and/or the like), fuel and/or hydraulic leaks, and/or the like.

During such inspections, the individuals typically have little or no point of references with respect to a prior status of the aircraft. Moreover, the individuals may not be fully capable of differentiating between hydrocarbon leaks or melted ice water.

Further, an engine of an aircraft may be located at a height above ground that does not allow an individual to walk and/or inspect underneath. For example, clearance between an engine extending below of an aircraft and the ground may be insufficient for an individual to walk underneath the engine for inspection. In short, the engine of a particular aircraft may be too low to allow for quick and easy inspection and/or discrimination between gradual melting of accumulated ice and hydrocarbon liquid leaks. As such, the individual may opt to view the engine from a side, instead of viewing or inspecting the engine from underneath (which may otherwise provide a more comprehensive assessment).

Additionally, the fuselage of an aircraft may be too low to allow for quick and easy movement between opposite sides of an aircraft. For example, an individual may need to walk entirely around an aircraft to inspect opposite sides, instead of being able to walk underneath the aircraft. Further, in extreme weather conditions (such as extreme cold or heat), inclement weather (such as rain or snow), and/or the like, the process of manually inspecting an aircraft may be challenging.

As can be appreciated, the process of visually inspecting various components of an aircraft before a flight is time-consuming, and may be ergonomically challenging. Further, the inspection process may be susceptible to human error, in that an individual may not be able to readily discern an actual status of one or more components of the aircraft, or perform historical comparisons between flights for potential gradually-occurring conditions. Further, inspection is also limited by manual methods and human interpretation, which are inherently subjective.

SUMMARY OF THE DISCLOSURE

A need exists for an efficient and reliable system and method of inspecting an aircraft before a flight. Further, a need exists for a system and method of comparing various components of an aircraft before a flight in relation to prior pre-flight inspections. Additionally, a need exists for an inspection system and method that allows for quicker turn-around of an aircraft between flights.

With those needs in mind, certain embodiments of the present disclosure provide a rapid aircraft inspection system that is configured to inspect one or more components of an aircraft before a flight. The aircraft inspection system includes an inspection robot that is configured to inspect the component(s) of the aircraft. The inspection robot includes a conveying sub-system that is configured to move the inspection robot to different locations, and a sensing sub-system including one or more sensors that are configured to sense one or more characteristics of the component(s) during an inspection. The sensing sub-system is configured to record the characteristic(s) as inspection data.

The sensor(s) may include one or more imaging devices, one or more optical (for example, visual, infrared, ultraviolet, etc.) sensors, one or more scanners (for example, non-destructive inspection scanners, such as laser-based scanners, vibrometric scanners, laser ultrasound scanners, microwave scanners, terahertz scanners, and/or the like), one or more acoustic and/or radio frequency receivers and interrogators, one or more luminescence sensors, and/or one or more hydrocarbon sensors.

The inspection robot may also include a sample collector that is configured to collect samples from the component(s) of the aircraft. In at least one embodiment, the sample collector includes a collection container in fluid communication with the sensor(s).

The inspection robot may include a communication device that is configured to allow for wireless communication with remote systems and devices.

The inspection robot may include a power source. In at least one embodiment, the power source is rechargeable.

In at least one embodiment, the inspection robot includes an inspection control unit operatively coupled to the conveying sub-system and the sensing sub-system. The inspection control unit is configured to control operation of the conveying sub-system and the sensing sub-system.

The aircraft inspection system may include a docking station. The inspection robot is configured to be deployed from and return to the docking station. In at least one embodiment, a power source of the inspection robot is configured to be recharged at the docking station.

In at least one embodiment, the aircraft inspection system includes a central database that stores reference data of the aircraft, and a monitoring control unit in communication with the central database. The monitoring control unit is configured to receive the inspection data from the sensing sub-system and compare the inspection data with the reference data to determine a status of the component(s) of the aircraft.

In at least one embodiment, the central database and the monitoring control unit are within a central monitoring station that is remote from the inspection robot. In at least one embodiment, inspection data and reference data are time labeled and maintained in an aircraft computer. In at least one other embodiment, the inspection robot includes one or both of the central database and/or the monitoring control unit.

The sensor(s) may include an infrared sensor that is configured to detect temperature gradients, for example as a result of trapped water or ice on the body of the aircraft. In this manner, the infrared sensor may detect the presence of water.

The sensing sub-system may be configured to determine one or both of balance and weight of the aircraft (which may be or include estimates thereof).

The sensing sub-system may be configured to determine one or more of alignment and tire status and tire pressure of a landing gear.

In at least one embodiment, the inspection robot includes a navigation sub-system including one or more scanners. The navigation sub-system is configured to navigate the inspection robot in relation to an aircraft and areas around the aircraft. The scanner(s) may be one or more light detection and ranging (LIDAR) sensors. The navigation sub-system may also be used for collision avoidance.

In at least one embodiment, the scanner(s) are configured to detect locations of a plurality of landing gear of the aircraft. The navigation sub-system is configured to determine a location of the inspection robot in relation to the component(s) of the aircraft based on detected locations of the plurality of landing gear.

In at least one embodiment, the scanner(s) are configured to detect signals emitted by one or more antennas of the aircraft or an airport. The navigation sub-system is configured to navigate the inspection robot based on the signals emitted by the one or more antennas of the aircraft or the airport. The signals may include one or more of surface movement radar (SMR), advanced surface movement guidance and control system (A-SMGCS), automatic dependent surveillance-broadcast/control (ADS-B, ADS-C), or aircraft communications addressing and reporting system (ACARS) signals.

Certain embodiments of the present disclosure provide an aircraft inspection method that is configured to inspect one or more components of an aircraft before a flight. The aircraft inspection method includes using an inspection robot to inspect the one or more components of the aircraft. The using the inspection robot operation includes moving the inspection robot to different locations with a conveying sub-system, sensing one or more characteristics of the component(s) during an inspection with one or more sensors of a sensing sub-system, and recording the characteristic(s) as inspection data.

DETAILED DESCRIPTION OF THE DISCLOSURE

Figure 1:
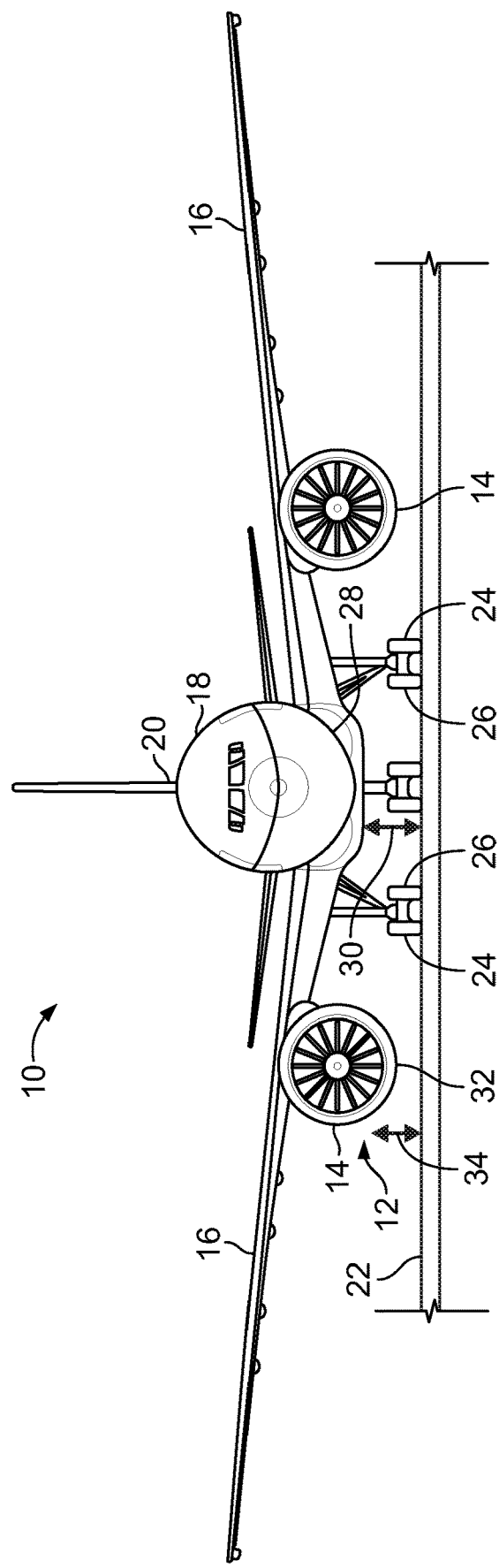
FIG. 1 is a diagrammatic representation of a front view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide aircraft inspection systems and methods that are configured to perform multiple pre-flight inspections of an aircraft. The aircraft inspection system may be an all-weather, all-terrain, ground-based automated robotic platform and data collection system that replaces a standard labor-intensive or potentially hazardous inspection performed by walking around the aircraft. The aircraft inspection system is configured to determine a location of the aircraft inspection system in relation to an aircraft, perform multiple types of inspections, and/or record inspection location data in airplane coordinates. Embodiments of the present disclosure provide aircraft inspection systems and methods that reduce manual labor and inspection time, reduce ergonomic and safety issues, reduce assessment errors, as well as increase data fidelity and usages (analytics, trending, maintenance planning, re-design, etc.).

In at least one embodiment, the aircraft inspection system includes an automated robot that is designed for on-ground checks of aircraft to validate flight-readiness. The aircraft inspection system provides an all-terrain, ground-based motion platform capable of teleoperation and semi-autonomous motion control, and may include a self-contained navigation or localization subsystem.

The aircraft inspection system includes one or more sensors that are configured to perform various inspections. The sensors may include cameras (such as ranging from infrared to ultraviolet cameras), lasers, fluid sensors, chemical sensors, microwave imaging systems, infrared sensors, ultrasonic sensors, terahertz imagers, X-ray imagers, thermal imaging sensors, hyperspectral/multispectral imaging sensors, and/or the like. Inspection data acquired by the aircraft inspection system may be stored in a database for future reference and analysis (for example, pictures taken of a potential oil leak may be compared from one day to the next, or at different airports each with an inspection robot available), and used for data analytics.

The navigation sub-system is configured to allow the aircraft inspection system to navigate underneath aircraft and locate various components for inspection. The navigation sub-system may include light detection and ranging (LIDAR)-based sensors for localization and collision avoidance.

Certain embodiments of the present disclosure provide a system and method for pre-flight inspection of an aircraft. The system includes a low-profile mobile robot equipped with a mounting platform provisioned with a number of inspection sensors (for example, cameras, gas chromatographs, and/or the like), laser based range sensors (for example, LIDAR systems), and a communication device (such as a wireless communication antenna or the like). The mobile robot is configured to inspect the underside of an aircraft at a number of pre-determined locations, while safely navigating from one location to another beneath the aircraft and safely avoiding objects within that same space.

Inspection and determination of aircraft components may be accomplished using one or more sensors including infrared, visible, and multispectral cameras, hydrocarbon sensors, and/or the like, and information systems that are accessible. In order to safely navigate safely from one location to another beneath the aircraft, the mobile robot is configured to use laser range sensors (LIDAR) to detect and identify aircraft components in the vicinity of the mobile robot (such as landing gear) where the physical geometry of these components at a given height above the tarmac (as determined by laser scanning) may be used to identify the components, while the relative distance between the mobile robot and these components may be used to determine the relative location of the mobile robot with respect to the aircraft as a whole.

By similar logic, the relative location and orientation of the mobile robot with respect to the airport facility may be determined by detecting and identifying fixed structures of the airport facility in the vicinity of the mobile robot. The physical geometry of these structures at a given height above the tarmac (as determined by laser scanning) may be used to identify the structures, while the relative distances between the mobile robot and these structures may be used to determine the relative location of the mobile robot with respect to the airport facility as a whole.

In at least one embodiment, the mobile robot is configured to use radio frequency (RF) signals originating from aircraft systems (such as radar, ADS-B, and/or the like) to determine a relative location of the mobile robot with respect to the aircraft as a whole. The mobile robot is configured to use RF signals originating from airport and air traffic control systems to determine the relative location of the mobile robot with respect to the airport facility as a whole. Global positioning system (GPS) signals and/or a plurality of local RF broadcast signals in the vicinity of the aircraft may be used to augment and enhance robot location and orientation determined using laser range sensors.

Certain embodiments of the present disclosure provide an aircraft inspection method that includes starting from a location in a vicinity of an aircraft, rotating a LIDAR scanner through 360 degrees while collecting direction and distance data, analyzing direction and distance data to identify and to determine the direction and location of known key features of the aircraft and/or airport structures, determining the location and orientation of the mobile inspection robot using the determined direction and location of known key features of the aircraft and/or airport structures, and inspecting the aircraft by navigating through a sequence of predetermined locations (relative to the aircraft). The navigating includes periodically determining and updating location using data from one or more sensors including inertial sensors, GPS receivers, LIDAR scans, and/or the like. The inspecting includes recording location, images, and other sensor data, while in motion along certain predetermined paths and while stopped at certain pre-determined locations (relative to the aircraft), analyzing the recorded images and other sensor data to determine if anomalous conditions are present, and reporting the results of the analysis to at least one member of the flight crew.

FIG. 1 is a diagrammatic representation of a front view of an aircraft 10, according to an embodiment of the present disclosure. The aircraft 10 includes a propulsion system 12 that may include two turbofan engines 14, for example. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers and a vertical stabilizer.

The fuselage 18 of the aircraft 10 defines an internal cabin, which includes a cockpit, and may include one or more work sections (for example, galleys, personnel carry-on baggage areas, and the like), one or more passenger sections (for example, first class, business class, and coach sections), and an aft section. On the ground 22, the aircraft 10 is supported by landing gear 24, which includes wheels 26. The lower portion 28 of the fuselage 18 may be at a lowermost height 30 above the ground 22 that may not allow individuals to easily walk underneath. Further, lower portions 32 of the engines 14 may be at lowermost heights 34 that may make it difficult for an individual to walk or inspect underneath.

As explained herein, embodiments of the present disclosure provide aircraft inspection systems and methods that include an inspection robot that is used to inspect various components of the aircraft. The inspection robot is sized and shaped to be able to move and navigate in relation to various components of the aircraft 10, such as the engines 14, the landing gear 24, and the like, in order to inspect the various components. In this manner, an individual need not walk around and underneath the aircraft 10 to inspect the components of the aircraft.

Alternatively, instead of an aircraft, embodiments of the present disclosure may be used with various other vehicles, such as automobiles, buses, locomotives and train cars, seacraft, spacecraft, and/or the like.

Figure 2:
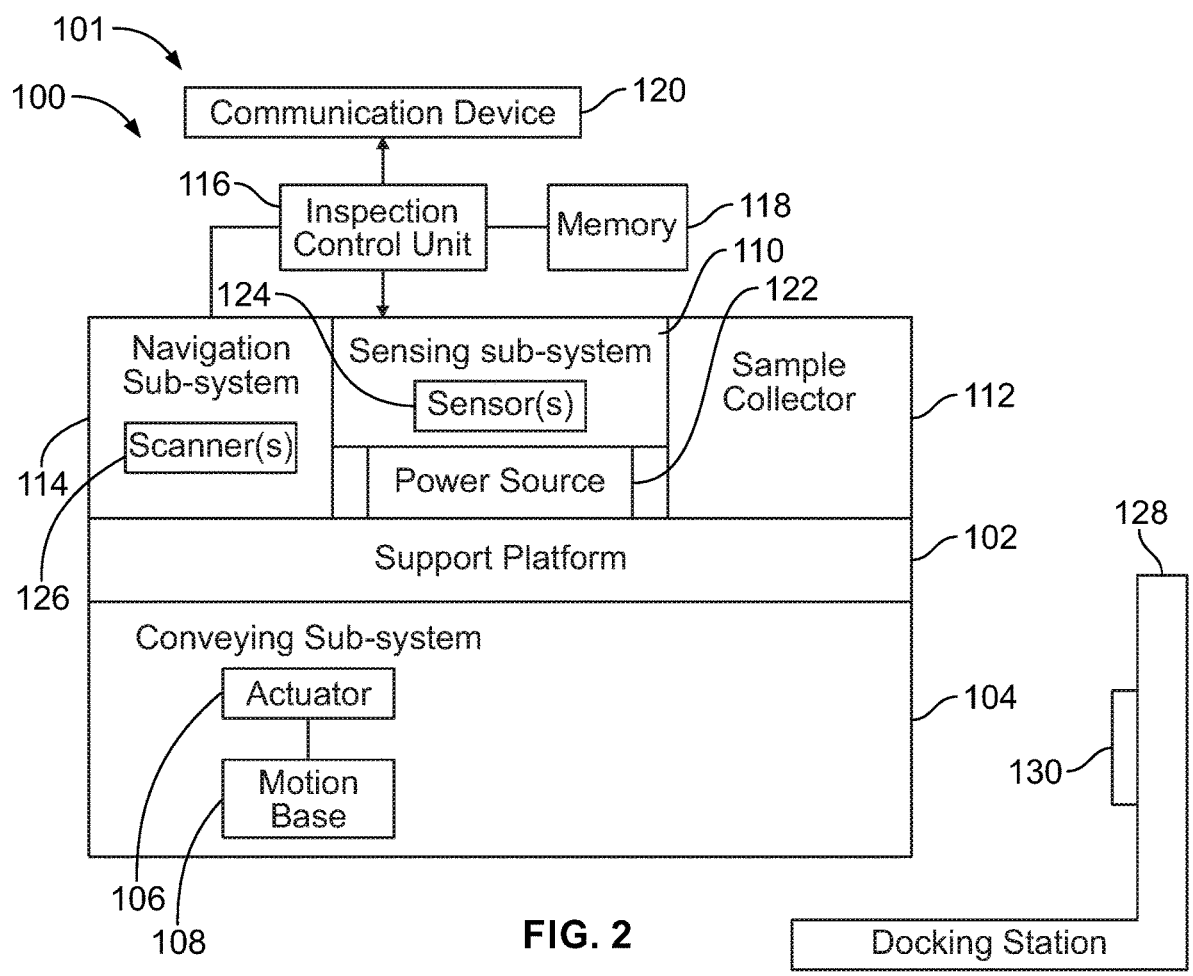
FIG. 2 is a schematic block diagram of an inspection robot, according to an embodiment of the present disclosure.

FIG. 2 is a schematic block diagram of an inspection robot 100, according to an embodiment of the present disclosure. An aircraft inspection system 101 includes the inspection robot 100. The inspection robot 100 is sized and shaped to move underneath an aircraft. In particular, the inspection robot 100 is sized to fit within clearance spaces between the ground and an aircraft's engines and fuselage. As such, the inspection robot 100 may be quickly and easily moved between various components of the aircraft.

The inspection robot 100 includes a support platform 102, such as a frame, base, and/or the like. The support platform 102 connects to a conveying sub-system 104 that is configured to allow the inspection robot 100 to move between various locations.

The conveying sub-system 104 includes an actuator 106 operatively coupled to a motion base 108. The actuator 106 may be a motor, engine, or the like that operates to cause the motion base 108 to move the inspection robot 100. The motion base 108 may be or include or more wheel(s), track(s), roller(s), moveable leg(s), hover device(s), and/or the like. The conveying sub-system 104 receives operating power from a power source 122, which is supported by the support platform 102. In at least one embodiment, the power source 122 may be located within the support platform 102, underneath the support platform 102, or within the conveying sub-system 104. In at least one embodiment, the support platform 102 is a detachable module that is independent from the conveying sub-system 104. In at least one embodiment, the support platform 102 and the conveying sub-system 104 may each include a separate and distinct power source.

In at least one embodiment, the support platform 102 supports a sensing sub-system 110, a sample collector 112, a navigation sub-system 114, an inspection control unit 116, a memory 118, a communication device 120, and the power source 122. The power source 122 may be one or more batteries, fuel tanks, and/or the like that are configured to provide operating power to the inspection robot 100.

The sensing sub-system 110 includes one or more sensors 124 that are configured to sense one or more characteristics (for example, features, attributes, or the like related to structural, electrical, hydraulic, chemical integrity, and/or the like) of one or more components (for example, engines, wings, control surfaces, exterior surfaces, landing gear, and/or the like) of an aircraft. For example, the sensor(s) 124 may include one or more imaging devices (such as multi-spectral imaging devices, thermal imaging devices, infrared imaging devices, photographic imaging devices, or other such cameras, x-ray devices, ultrasonic devices, and/or the like), three-dimensional scanning sensors, luminescence sensors, hydrocarbon sensors, and/or the like. The sensing sub-system 110 is coupled to the power sources 122, such as through one or more wired or wireless connections. Further, the sensing sub-system 110 is operatively coupled to the inspection control unit 116 through one or more wired or wireless connections.

The sample collector 112 is configured to collect samples from one or more components of the aircraft. For example, the sample collector 112 may include a basin, bowl, pan, or other container that is configured to collect fluids from components of the aircraft, such as the engines. The sample collector 112 may be in fluid communication with one or more sensor(s) 124 of the sensing sub-system 110, such as a hydrocarbon sensor. Alternatively, the inspection robot 100 may not include the sample collector 112.

The navigation sub-system 114 is operatively coupled to the inspection control unit 116 through one or more wired or wireless connections, and is powered by the power source 122. The navigation sub-system 114 is configured to navigate the inspection robot 100 in relation to an aircraft and areas around the aircraft, such as at an airport. The navigation sub-system 114 includes one or more scanners 126, such as lasers, LIDAR scanners, GPS devices, and/or the like that are configured to scan an area surrounding the inspection robot 100 to provide the navigation sub-system 114 with data needed to compute a current location, which enables the the inspection robot 100 to effectively move in relation to various locations and avoid collision with objects.

The inspection control unit 116 is operatively coupled to the conveying sub-system 104, the sensing sub-system 110, the navigation sub-system 114, and the communication device 120 through one or more wired or wireless connections. The inspection control unit 116 includes or is coupled to the memory 118, which stores instructions for operation of the inspection robot 100. The inspection control unit 116 is configured to control operation of the inspection robot 100. It is to be understood that the inspection control unit 116 may include a plurality of processors, which may or may not be directly connected, that may be configured to control various aspects of the inspection robot 100. For example, the navigation sub-system 114 may be controlled by one or more processors, while the conveying sub-system 104 may be controlled by different processor(s). All of the various controllers, processors, and/or the like are generally encompassed by the inspection control unit 116.

The communication device 120 may be one or more of antenna, transceiver, Wi-Fi antenna, and/or the like. The communication device 120 is configured to allow the inspection robot 100 to communicate (such as wirelessly) with remote systems and devices. For example, the inspection robot 100 is configured to wirelessly communicate with a remote, central monitoring station 200 (shown in FIG. 3) via the communication device 120. The systems and devices may be remote in that they may be separated by distances of 100 or less feet, or greater than 100 feet, such as more than 1 mile away.

In at least one embodiment, the inspection robot 100 is configured to be deployed from and return to a docking station 128. The docking station 128 may include a power coupler 130 that is configured to connect to a reciprocal coupler of the power source 122. When the power coupler 130 is connected to the power source 122, the power source 122 may be recharged, such as from a main source of electric power. Optionally, the power source 122 may be a fuel tank that receives fuel, such as gasoline or natural gas. Alternatively, the docking station 128 may not be used.

Figure 3:
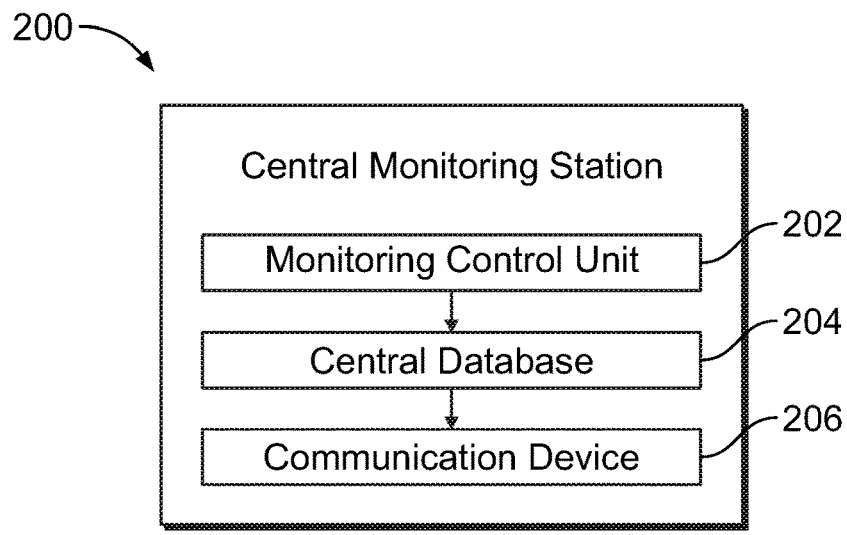
FIG. 3 is a schematic block diagram of a central monitoring station, according to an embodiment of the present disclosure.

FIG. 3 is a schematic block diagram of the central monitoring station 200, according to an embodiment of the present disclosure. The central monitoring station 200 includes a monitoring control unit 202 in communication with a central database 204 and a communication device 206 through one or more wired or wireless connections. The communication device 206 may be one or more antennas, transceivers, Wi-Fi antennas, and/or the like that allow the central monitoring station 200 to communicate with the inspection robot 100 (shown in FIG. 2).

As shown, the central monitoring station 200 may include the monitoring control unit 202 and the central database 204. Optionally, the inspection robot 100 may include one or both of the monitoring control unit 202 and/or the central database 204. The central monitoring station 200 may be on-board an aircraft, within an airport, or at various other locations.

Referring to FIGS. 2 and 3, the central database 204 stores reference data for one or more aircraft. The reference data may be inspection data of the aircraft that is stored from prior inspections. For example, the database 204 stores reference data for various components of an aircraft. In at least one embodiment, the reference data may be or include data regarding properly operating components of the aircraft.

In operation, before a flight, the inspection robot 100 performs various inspection tests of the aircraft. The inspection robot 100 uses the navigation sub-system 114 to determine the location of various components of the aircraft for tests, as determined and controlled by the inspection control unit 116 (which executes instructions that are stored in the memory 118). The conveying sub-system 104 moves the inspection robot 100 between the various components to be inspected. The sensing-subsystem 110 senses various characteristics of the components. Inspection data acquired by the sensor(s) 124 may be stored in the memory 118 and/or sent to the monitoring control unit 202, which may then compare the acquired data with the reference data stored in the central database 204. The monitoring control unit 202 compares the acquired inspection data from the sensing sub-system 110 with the reference data stored in the central database 204 to determine if anomalies exist between the acquired inspection data and the stored reference data. If anomalies do not exist, the monitoring control unit 202 determines that the components have passed the inspection tests. If, however, anomalies do exist, the monitoring control unit 202 outputs an alert signal indicating that one or more components of the aircraft may need further inspection.

The central monitoring station 200 outputs inspection test results to an operator of aircraft. For example, the monitoring control unit 202 outputs inspection test results via the communication device 206 to a flight computer and/or a handheld device (for example, a smart phone, tablet, or the like) indicating the results of the various pre-flight inspection tests of the various components of the aircraft.

In at least one embodiment, the inspection robot 100 outputs the inspection data to the central monitoring station as the inspection data is acquired from the sensor(s) 124. In at least one other embodiment, the inspection robot 100 may store the inspection data within the memory 118 until all of the pre-flight inspection checks and tests performed by the inspection robot 100 are completed, and then output the inspection data covering all of the pre-flight inspection checks and tests to the central monitoring station 200. In at least one other embodiment, the inspection robot 100 may include the central database 204 (such as within the memory 118), or at least a portion therefore relating to a particular aircraft, which allows the inspection robot 100 itself to compare the acquired inspection data to stored data regarding the aircraft and output test results to the operator of the aircraft.

As indicated, the aircraft inspection system 101 includes the inspection robot 100. In at least one embodiment, the aircraft inspection system 101 includes the inspection robot 100 and the central monitoring station 200. In at least one other embodiment, the aircraft inspection system 101 does not include the central monitoring station 200, such as when the inspection robot 100 includes the central database 204 (and/or the monitoring control unit 202) shown in FIG. 3.

In at least one embodiment, at least one of the sensors 124 may be or include an infrared sensor that is configured to detect water ingress in various portions of an aircraft. For example, infrared sensors 124 may sweep infrared energy over portions of the aircraft. The infrared red sensors 124 detect temperature gradients, thereby allowing for determination of areas of water ingress, leaking, accumulation, and/or the like. The IR or other such thermal imaging sensors 124 may be used to acquire data regarding composite structures of the aircraft which may retain water, for example. In this manner, the sensors 124 may be used to identify portions of the aircraft that may be due for maintenance or replacement.

The sensors 124 may be used to provide visual data of the aircraft. The visual data is stored as inspection data, and compared against reference data stored in the central database 204. The inspection data acquired by the sensor(s) 124 and the reference data is compared by the monitoring control unit 202 to determine whether anomalies exist therebetween. Existing anomalies may indicate possible degradation and/or damage (such as due to an impact) to portions of the aircraft.

As used herein, the term "control unit," "central processing unit," "unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the inspection control unit 116 and the monitoring control unit 202 may be or include one or more processors that are configured to control operation of the aircraft inspection system 101, as described herein.

The inspection control unit 116 and the monitoring control unit 202 are configured to execute a set of instructions that are stored in one or more data storage units or elements (such as one or more memories), in order to process data. For example, the inspection control unit 116 and the monitoring control unit 202 may include or be coupled to one or more memories. The data storage units may also store data or other information as desired or needed. The data storage units may be in the form of an information source or a physical memory element within a processing machine.

The set of instructions may include various commands that instruct the inspection control unit 116 and the monitoring control unit 202 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein illustrate one or more control or processing units, such as the inspection control unit 116 and the monitoring control unit 202. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the inspection control unit 116 and the monitoring control unit 202 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 4:
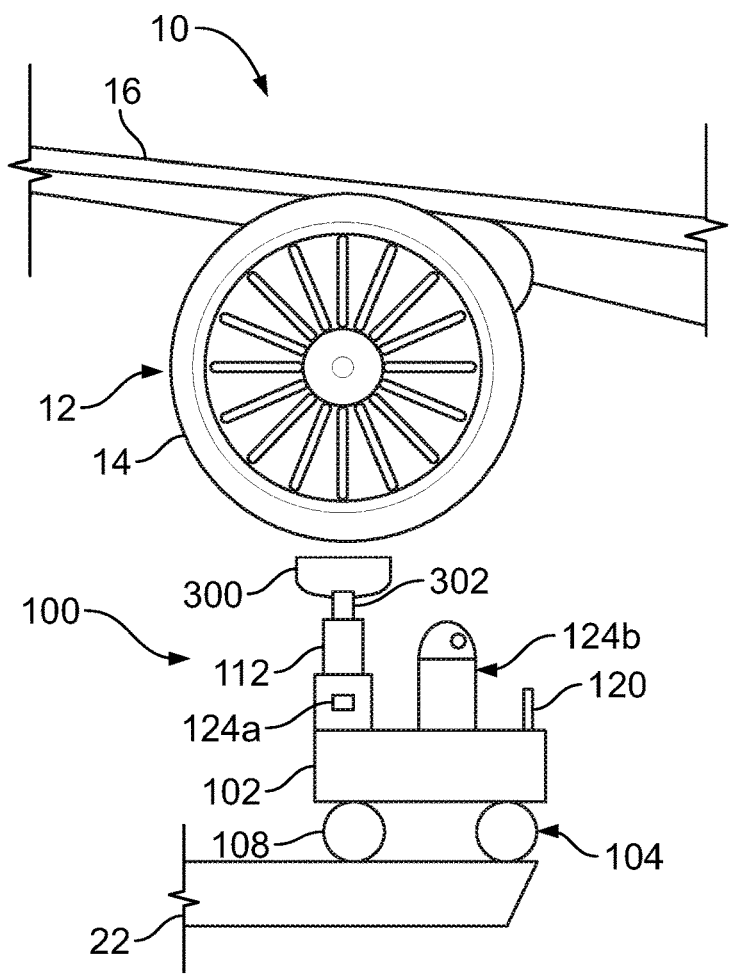
FIG. 4 is a simplified diagram of a side view of an inspection robot underneath an engine of an aircraft, according to an embodiment of the present disclosure.

FIG. 4 is a simplified diagram of a side view of the inspection robot 100 underneath an engine 14 of the aircraft 10, according to an embodiment of the present disclosure. As shown, the motion base 108 of the conveying sub-system 104 may include one or more wheels. In this embodiment, the inspection robot 100 includes the sample collector 112, which includes a collection container 300 that is in fluid communication with a sensor 124a, such as a hydrocarbon sensor, through one or more conduits, such as tubes, hoses, and/or the like. The sample collector 112 may include a telescopic arm 302 or other such end effector to move the collection container 300 closer to and/or in contract with the engine 14.

Referring to FIGS. 1-4, in operation, the inspection control unit 116 navigates the inspection robot 100 underneath the engine 14, via the navigation sub-system 114. The collection container 300 is positioned underneath the engine 14 in order to collect fluids that may drip, leak, flow, or otherwise drop from the engine 14. Fluids from the engine 14 that are received in the collection container 300 are analyzed by the sensor 124a to determine the nature of the fluid. For example, the hydrocarbon sensor 124a is able to discern between leaked fuel or oil from the engine, and water that drips from an outer surface of the engine 14. The inspection control unit 116 outputs inspection data output by the sensor 124a for analysis, such as by the central monitoring control unit 202.

The sensing sub-system 110 may also include a visual sensor 124b, such as a multispectral imaging system, thermal imaging system, or other such camera. The visual sensor 124b is configured to acquire one or more images of the engine 14 and/or other components of the aircraft. The acquired images from the visual sensor 124b are compared with stored images or other such data of the component(s) within the central database 204. The acquired images and the stored data within the central database 204 are analyzed by the monitoring control unit 202 to determine whether or not anomalies exist therebetween.

Figure 5:
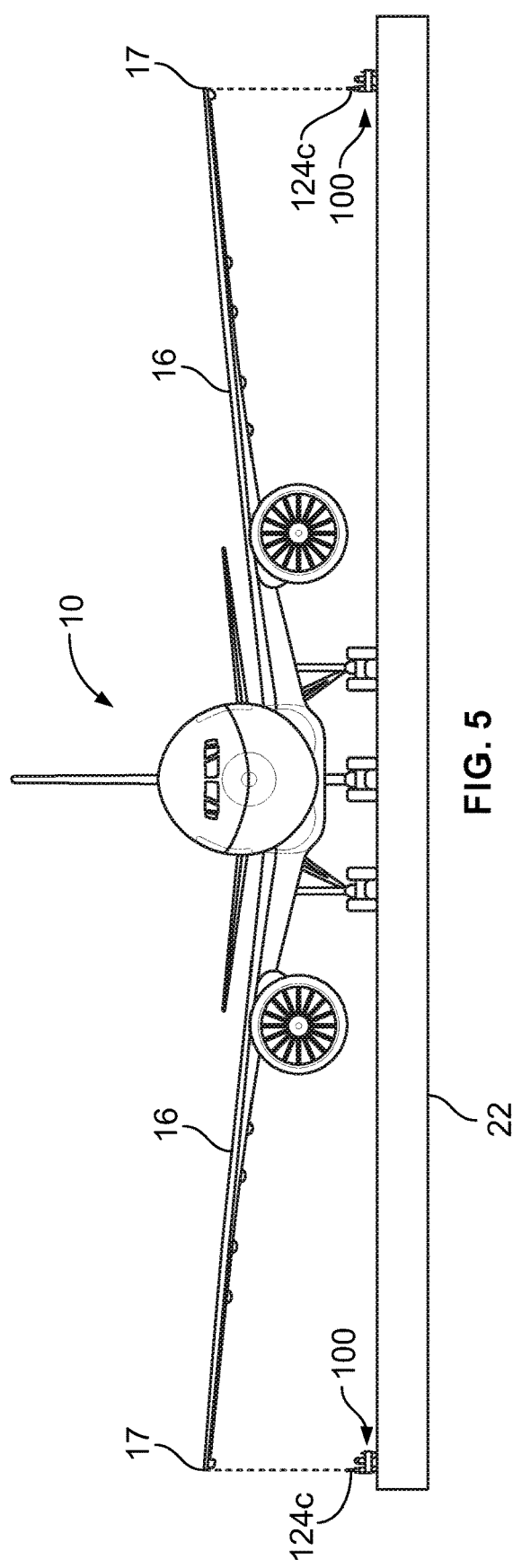
FIG. 5 is a simplified diagram of a side view of an inspection robot underneath wings of an aircraft, according to an embodiment of the present disclosure.

FIG. 5 is a simplified diagram of a side view of the inspection robot 100 underneath the wings 16 of the aircraft 10 according to an embodiment of the present disclosure. Referring to FIGS. 1-3 and 5, the sensing sub-system 110 may include an optical sensor 124c, such as a laser, which is configured to detect a distance in relation to a component. The optical sensor 124c may be used to detect a distance between wing tips 17 and the ground 22. In this manner, the sensor 124c acquires wing tip data, which may then be analyzed by the monitoring control unit 202 and/or the inspection control unit 116 to indirectly determine balance and weight of the aircraft 10. For example, if the distances between both wing tips 17 and the ground 22 are the same or substantially the same, the aircraft 10 is balanced side-to-side. If, however, the distances differ, then the aircraft 10 may not be balanced. Similarly, additional height measurements on the nose or tail of the aircraft 10 may be acquired and compared to reference height data or balance formulas to determine front-to-back balance.

The optical sensors 124c may be used for laser-assisted alignments through optional fiducial referencing. The fiducials may be or include portions of the wing tips 17. The inspection control unit 116 and/or the monitoring control unit 202 may analyze the data acquired by the optical sensors 124c to estimate a weight and/or balance of the aircraft 10.

Figure 6:
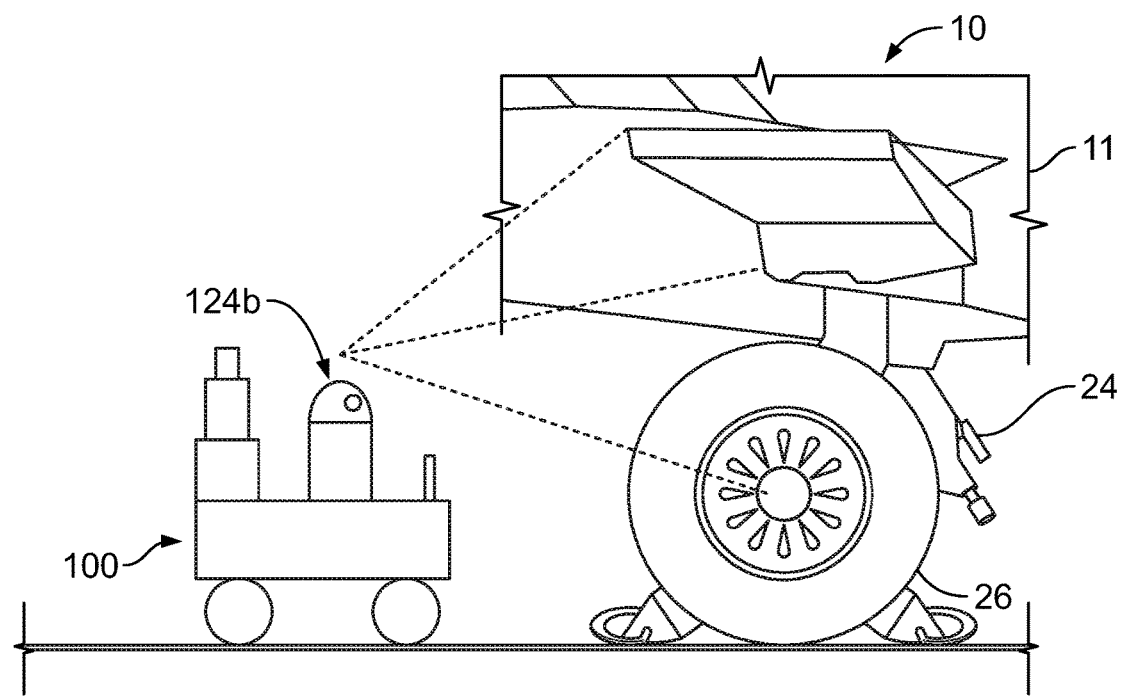
FIG. 6 is a simplified diagram of an inspection robot proximate to landing gear of an aircraft, according to an embodiment of the present disclosure.

FIG. 6 is a simplified diagram of the inspection robot 100 proximate to landing gear 24 of the aircraft 10, according to an embodiment of the present disclosure. FIG. 6 shows a rectangular border box 11 in which the landing gear 24 is shown. Referring to FIGS. 1-3 and 6, the visual sensor 124b (such as a camera) may be used to acquire image(s) of the landing gear 24. The acquired image of the landing gear 24 is compared to prior data (such as prior images) of the landing gear 24 stored in the central database 204 in order to determine whether portions of the landing gear 24 are in alignment, wheels 26 have appropriate tire pressure, and/or the like. For example, the visual sensor 124b may acquire images of the wheels 26, which may differ from those stored in the central database 204, thereby indicating an anomaly in tire pressure.

Figure 7:
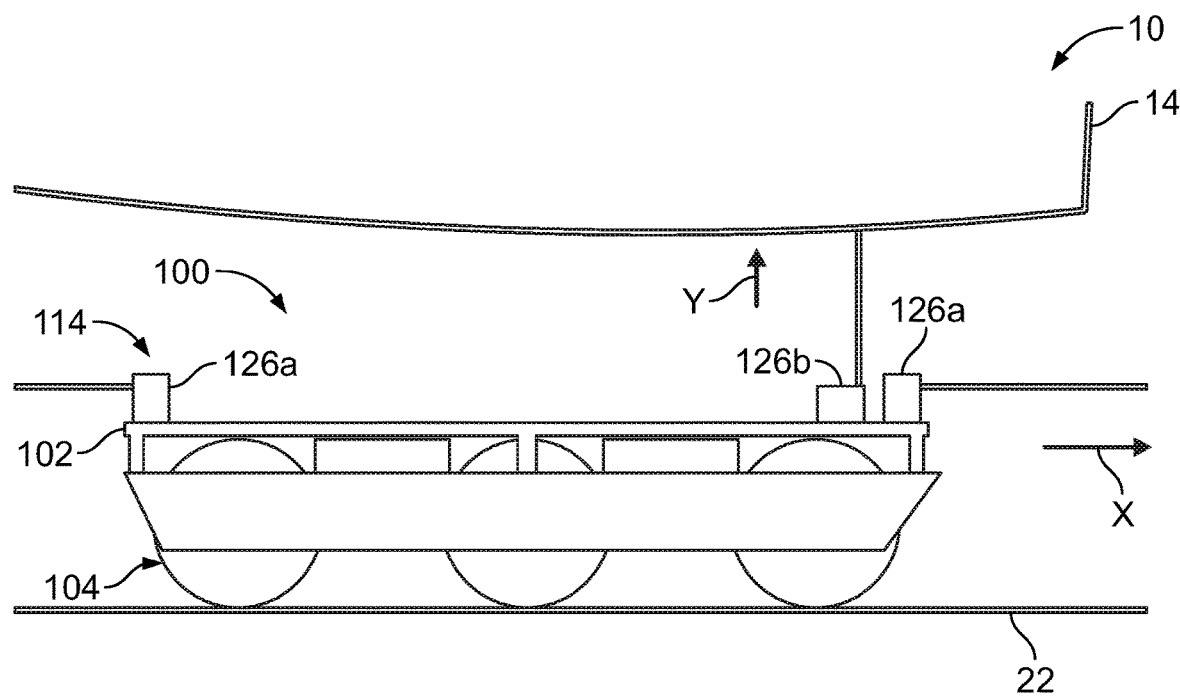
FIG. 7 is a simplified diagram of a side view of an inspection robot underneath an engine of an aircraft, according to an embodiment of the present disclosure.

FIG. 7 is a simplified diagram of a side view of the inspection robot 100 underneath an engine 14 of the aircraft 10, according to an embodiment of the present disclosure. The navigation sub-system 114 may include a plurality of laser scanners 126a and 126b. The laser scanners 126a are configured to emit laser energy in a horizontal plane relative to the ground, which is generally parallel to the ground, while the laser scanner(s) 126b are configured to emit laser energy in a vertical plane, which is generally perpendicular to the ground. The laser scanners 126a are used to navigate the inspection robot 100 between various locations and avoid collisions with other objects. The laser scanner(s) 126b are used to detect distances to the engine 14 and/or surface features of the engine 14. The laser scanners 126a and/or 126b may be used for navigation and sensing of features of the aircraft 10. That is, the laser scanners 126a and/or 126b may form part of the navigation sub-system 114 and the sensing sub-system 110. Optionally, the laser scanners 126a and 126b may be used exclusively by the navigation sub-system 114. Also, optionally, the location estimate may be continuously refined over time by using multiple scans acquired as the inspection robot 100 moves through an environment.

The laser scanners 126a and 126b may be part of a LIDAR navigation sub-system. The inspection robot 100 may include general purpose camera for navigation work lights, and/or the like. The laser scanners 126a and 126b may be used in relation to three-dimensional optical template matching or laser-based triangulation to locate various components and features of the aircraft 10.

Figure 8:
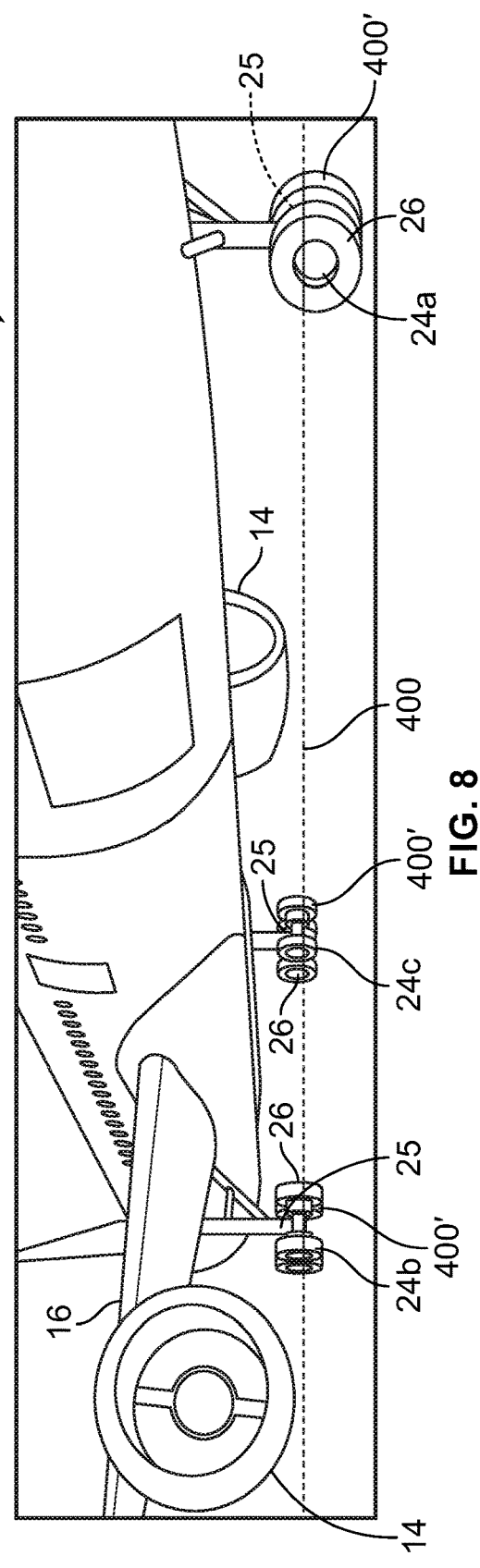
FIG. 8 is a perspective ground-level view of an aircraft, according to an embodiment of the present disclosure.
Figure 9:
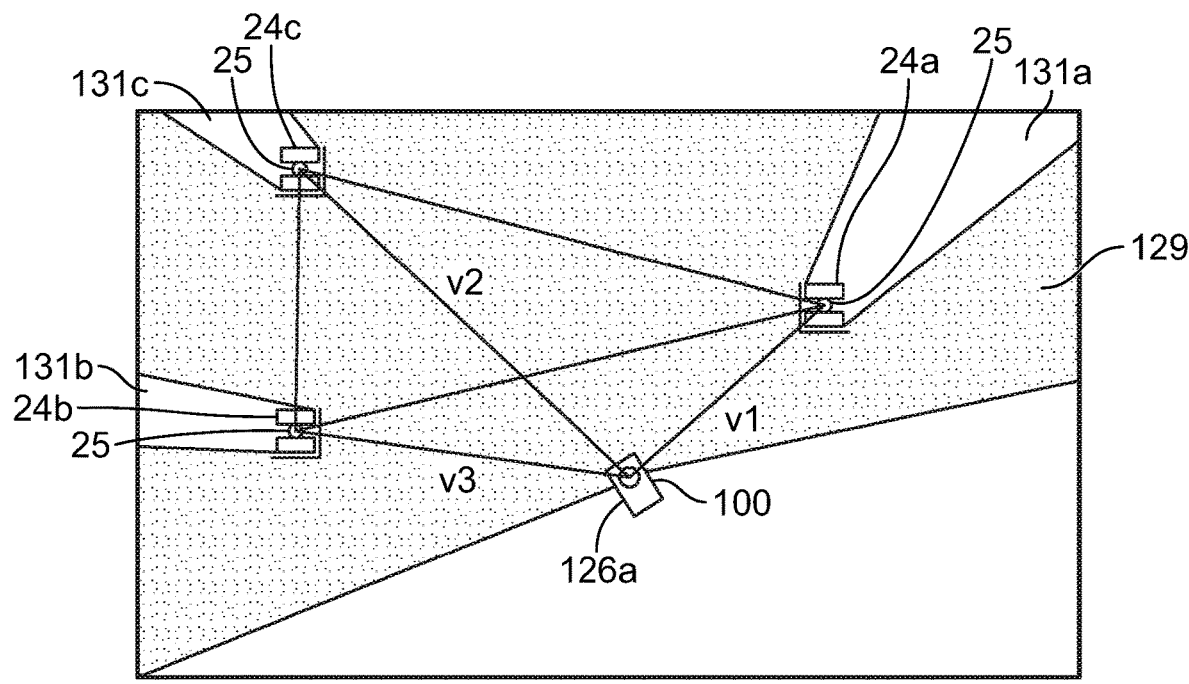
FIG. 9 is a diagrammatic representation of a simplified top plan view and associated vector diagram of an inspection robot in relation to landing gear of an aircraft, according to an embodiment of the present disclosure.

FIG. 8 is a perspective rendering of a ground-level view of the aircraft 10, according to an embodiment of the present disclosure. FIG. 9 is a diagrammatic representation of a simplified top plan view and associated vector diagram of the inspection robot 100 in relation to landing gear 24a, 24b, and 24c of the aircraft 10, according to an embodiment of the present disclosure. Referring to FIGS. 8 and 9, the aircraft 10 includes three landing gear 24a, 24b, and 24c. The landing gear 24a is proximate to the front of the aircraft 10 and is generally aligned with a central longitudinal plane of the aircraft 10. The landing gear 24b and 24c are located aft of the landing gear 24a, and are offset from the central longitudinal plane of the aircraft 10. The landing gear 24b is disposed towards and/or under one wing 16, while the landing gear 24c is disposed towards and under an opposite wing 16.

Referring to FIGS. 7-9, the laser scanners 126a are positioned on the support platform 102 at a height at which they emit laser energy in a horizontal plane 400 that is below the engines 14. The laser energy is configured to impinge upon portions of the wheels 26 of the landing gear 24a-c. Because the horizontal plane 400 is below the engines 14, the laser energy is not blocked by portions of the engines 14. As shown in FIG. 9, in particular, at least one of the laser scanners 126*a* scans laser energy over a scan area 129. The laser energy is blocked by the landing gear 24*a*, 24*b*, and 24*c* to provide occluded regions 131*a*, 131*b*, and 131*c* that change as the inspection robot 100 moves underneath and around the aircraft 10.

The horizontal plane 400 shown represents a path swept by the laser scanners 126*a*. The horizontal plane 400 includes portions 400' that intersect the landing gear 24*a*, 24*b*, and 24*c*. The laser scanners 126*a* are able to detect the landing gear 24*a*, 24*b*, 24*c* via the intersecting portions 400'. In this manner, distinguishable portions of the aircraft 10 are located (namely, the landing gear 24*a*, 24*b*, and 24*c*), which are then used for determining the location of the inspection robot 100 relative to the aircraft 10.

The emitted laser energy from the laser scanners 126*a* is used to detect the positions of the landing gear 24*a*, 24*b*, and 24*c*. An optional image processing enhancement may be used to improve the ability to distinguish between landing gear and other objects that may be in the environment. Image processing techniques, such as sliding window scanning approach, may be used with video from an on-board camera along with on- or off-board computation. For example, the inspection robot 100 may travel around the three landing gear 24*a*, 24*b*, and 24*c* (or simply emit laser energy allowing a sweep angle from one position) to determine the three positions (for example, the centroids of the bounding boxes) of the landing gear 24*a*, 24*b*, and 24*c*. The detected positions of the landing gear 24*a*, 24*b*, and 24*c* are compared to stored data regarding the landing gear 24*a*, 24*b*, and 24*c*, which correlates the detected positions with a center point 25 of each landing gear 24*a*, 24*b*, and 24*c*. As one example, the central database 204 (shown in FIG. 3) may include a data map of the landing gear 24*a*, 24*b*, and 24*c* that correlates detected positions with the center points 25 of the landing gear 24*a*, 24*b*, and 24*c*. By detecting the three positions of the landing gear 24*a*, 24*b*, 24*c*, the detected positions may be mapped against data stored in the central database 204, which correlates the detected positions with the center points 25.

Accordingly, the navigation sub-system 114, via the laser scanners 126*a*, is able to determine the center points 25 of all three landing gear 24*a*, 24*b*, and 24*c*. The center points 25 of the landing gear 24*a*, 24*b*, and 24*c* are correlated with the various components of the aircraft 10 to be inspected. For example, a component map of the aircraft 10 is stored in the central database 204 or the memory 118 (shown in FIG. 1). The three center points 25 of the landing gear 24*a*, 24*b*, and 24*c* are registered with the components to be inspected (such as the engines 14). In at least one embodiment, the systems and methods described herein may be configured to solve for alignment between measured and known values, also referred to as solving the pose problem. In general, the inspection control unit 116 of the inspection robot 100 is able to locate the components to be inspected, and move the inspection robot 100 to the various components by way of the navigation sub-system 114 locating the three center points 25 of the landing gear 24*a*, 24*b*, and 24*c* in relation to the inspection robot 100.

During motion of the inspection robot 100 underneath the aircraft 10, the laser scanners 126*a* are used to detect objects on the ground. Objects detected by the laser scanners 126*a* are avoided by the inspection robot 100. As such, the navigation sub-system 114 is used to navigate the inspection robot 100 and avoid objects underneath and around the aircraft 10. In the same manner, the navigation sub-system 114 is used to navigate and move the inspection robot within areas proximate to and/or remote from the aircraft 10, such as within an apron, which is a defined area of an airport intended to accommodate aircraft (for example, aircraft parking position, aircraft service areas, taxi lanes, roadways, and/or the like).

Figure 10:
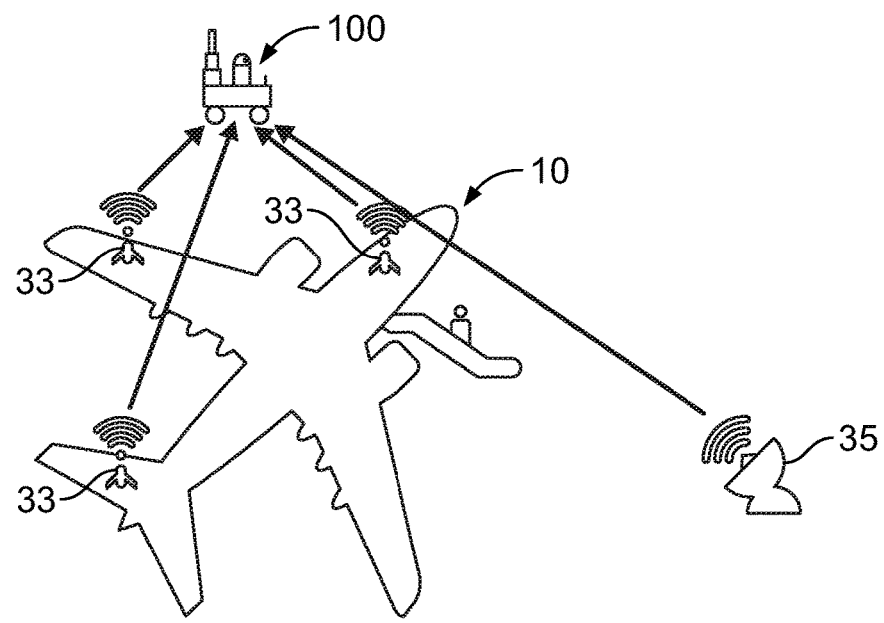
FIG. 10 is a diagrammatic representation of a simplified top view of an inspection robot in relation to an aircraft, according to an embodiment of the present disclosure.

FIG. 10 is a diagrammatic representation of a simplified top plan view of the inspection robot 100 in relation to the aircraft 10, according to an embodiment of the present disclosure. Referring to FIGS. 1 and 10, in this embodiment, the navigation sub-system 114 may utilize broadcasted signals to and/or from the aircraft 10 and/or an airport to determine a position of the inspection robot 100 in relation to the aircraft 10 and/or an airport. The signals are available in the airport for operation and harvesting by the inspection robot 100. The signals may include surface movement radar (SMR), advanced surface movement guidance and control system (A-SMGCS), automatic dependent surveillance-broadcast/control (ADS-B, ADS-C), aircraft communications addressing and reporting system (ACARS) signals, and/or the like. Further, aircraft 10 includes numerous antennas 33 that are used for navigation, communication, weather prediction, and/or the like. The signals output by the antennas 33 and/or one or more airport antennas 35 may be utilized by the navigation sub-system 114 of the inspection robot 100 to navigate motion of the inspection robot 100 in relation to the aircraft 10 and the airport.

The signals emitted by the antennas 33 and/or 35 exhibit spectral diversity (as they operate at different frequencies), phase diversity (as some of them use antennas at different locations and when simulcast result in phase differences), coding diversity (as the payload of some of the signals contain equipment identification, coordinates, time stamping signals, and/or the like), and polarization diversity (as the signal may be linearly polarized, which may help sift out multipath signals from direct line of sight signals). The navigation sub-system 114 may use the signals emitted by a plurality of the antennas 33 and/or 35 to triangulate a position in relation to the antennas 33 and/or 35, and therefore in relation to the aircraft 10 and/or the airport. The navigation sub-system 114 may be used to locate a position of the inspection robot 100 in relation to the aircraft 10 and/or the airport through triangulation, azimuth/elevation, time difference of signal arrival, and/or the like.

In at least one other embodiment, the navigation sub-system 114 may be a GPS system that is configured to provide navigation data in relation to the aircraft 10 and/or the airport through GPS signals.

Figure 11:
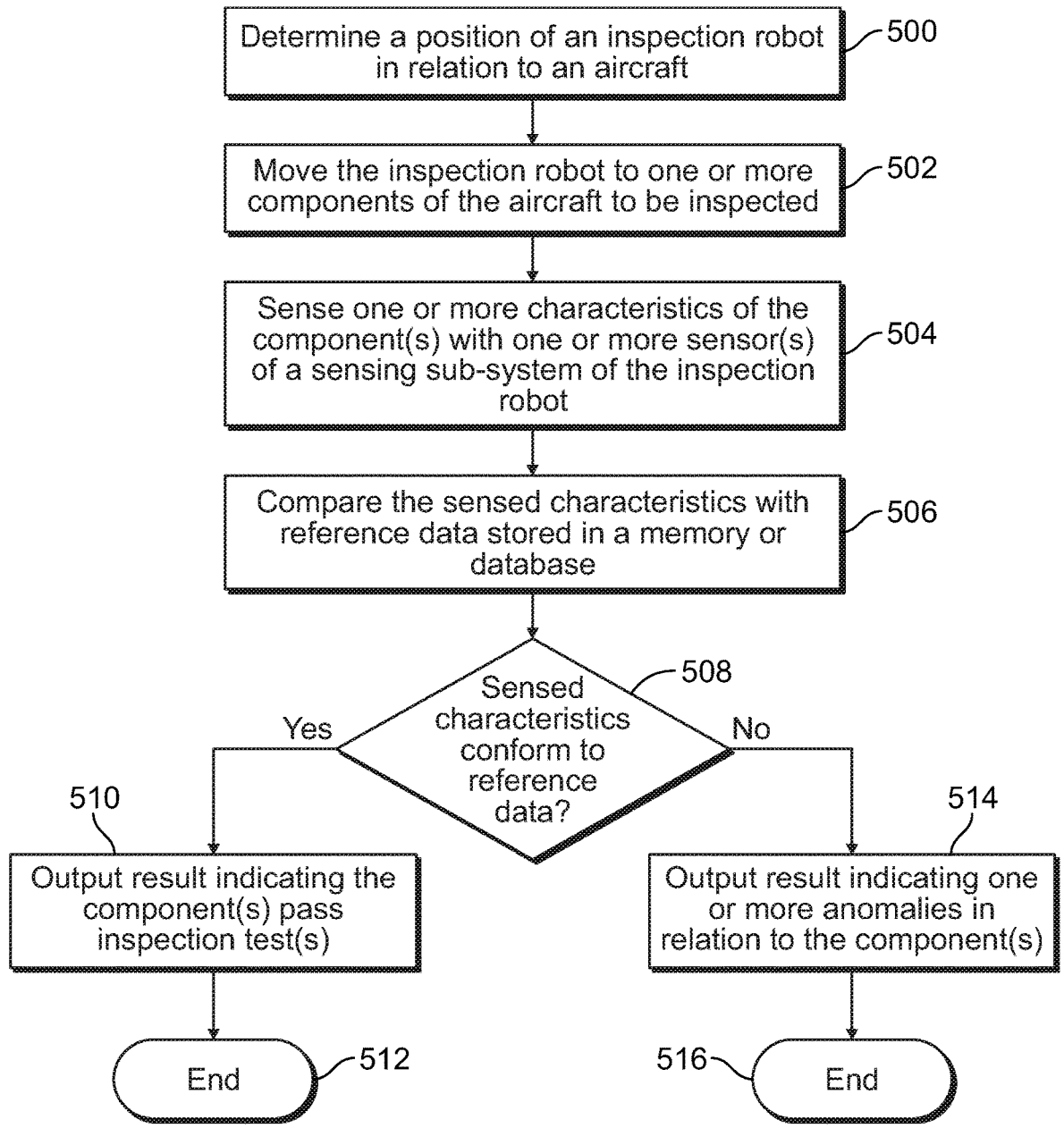
FIG. 11 illustrates a flow chart of an aircraft inspection method, according to an embodiment of the present disclosure.

FIG. 11 illustrates a flow chart of an aircraft inspection method, according to an embodiment of the present disclosure. Referring to FIGS. 1-3 and 11, the method begins at 500, at which a position of the inspection robot 100 is determined in relation to the aircraft 10. At 502, the inspection robot 100 is moved to one or more components of the aircraft 10 to be inspected. At 504, one or more characteristics of the component(s) are sensed by one or more sensor(s) 124 of the sensing sub-system 110 of the inspection robot 100. At 506, the sensed characteristics are compared with reference data (stored in the memory 118 and/or the database 204).

At 508, it is determined (by the inspection control unit 116 and/or the monitoring control unit 202) if the sensed characteristics (in the form of acquired inspection data) conform to the reference data. If the sensed characteristics do conform to the reference data, the method proceeds to 510, at which a result indicating that the component(s) pass inspection test(s) is output, such as to a flight computer of the aircraft 10. The method then ends at 512.

If, however, the sensed characteristics do not conform to the reference data at 508, the method proceeds to 514, at which a result indicating the presence of one or more anomalies in relation to the component(s). The method then ends at 516.

Figure 12:
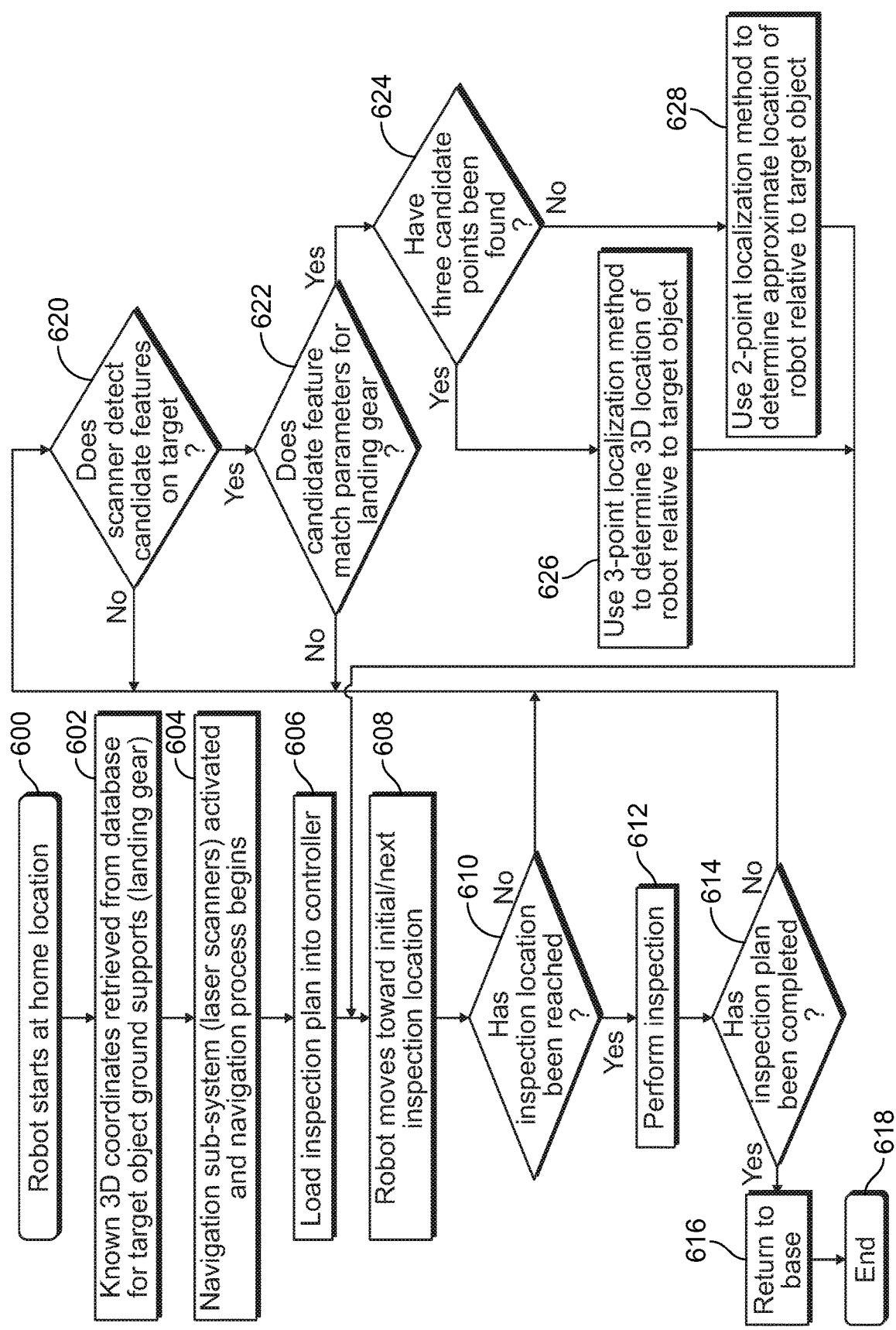
FIG. 12 illustrates a flow chart of an aircraft inspection method, according to an embodiment of the present disclosure.

FIG. 12 illustrates a flow chart of an aircraft inspection method (including localization and navigation), according to an embodiment of the present disclosure. Referring to FIGS. 1-3 and 12, the method begins at 600, at which the inspection robot 100 starts at a home location, such as the docking station 128. At 602, known three dimensional coordinates are retrieved from the central database 204 for target object ground supports (such as landing gear). At 604, the navigation sub-system 114 is activated to allow the inspection robot 100 to be navigated in relation to the aircraft 10. At 606, an inspection plan indicating various components to be inspected is loaded into the inspection control unit 116.

At 608, the inspection robot 100 is moved toward an inspection location of a component of the aircraft. At 610, the inspection control unit 116 determines if the inspection location has been reached. If, at 610, the inspection location has not been reached, the method returns to 608 (that is, the inspection robot 100 continues to be moved towards the inspection location). If the inspection location has been reached at 610, the inspection is performed at 612. At 614, the inspection control unit 116 determines if the inspection plan has been completed. If so, the inspection robot 100 returns to base (such as the docking station 128), and the method ends at 618.

If at 614, the inspection plan has not been completed, the method continues to 620, at which the inspection control unit 116 determines if the scanner(s) 126 detect candidate features on a target (i.e., the component to be inspected). If not, the method returns to 608, at which the inspection robot 100 is moved until the scanner(s) detect the candidate features. If at 620, one or more candidate features are detected, the inspection control unit 116 determines if the candidate features match parameters for landing gear. If not, the process returns to 608.

If the candidate features do match parameters for landing gear, the method continues to 624, at which the inspection control unit 116 determines whether three candidate points representing the three landing gear have been found. If not, the method proceeds to 628, at which two point location is used to determine an approximate location of the inspection robot relative to a target object. If, however, at 624, the three candidate points related to the three landing gear have been found, the method continues to 626, at which three point localization is used to determine a three dimensional location of the inspection robot 100 relative to the target object. The method then returns to 608.

As described herein, embodiments of the present disclosure provide efficient and reliable systems and methods of inspecting an aircraft before a flight. Further, embodiments of the present disclosure provide systems and methods of comparing various components of an aircraft before a flight in relation to prior pre-flight inspections. Additionally, embodiments of the present disclosure provide inspection systems and methods that allow for quick turnaround of an aircraft between flights.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An aircraft inspection system that is configured to inspect one or more components of an aircraft before a flight, the aircraft inspection system comprising:
   an inspection robot that is configured to inspect the one or more components of the aircraft, wherein the inspection robot comprises:
      a conveying sub-system that is configured to move the inspection robot to different locations;
      a sensing sub-system that is one or both of on or within the inspection robot, the sensing sub-system including one or more sensors that are configured to sense one or more characteristics of the one or more components during an inspection, wherein the sensing sub-system, which is one or both of on or within the inspection robot, is configured to record the one or more characteristics as inspection data, wherein the sensing sub-system is configured to determine balance of the aircraft; and
  a sample collector that is configured to collect samples from the one or more components of the aircraft, wherein the sample collector is in fluid communication with the one or more sensors of the sensing sub-system of the inspection robot.

2. The aircraft inspection system of claim 1, wherein the one or more sensors comprise one or more imaging devices, one or more optical sensors, one or more scanners, one or more luminescence sensors, and one or more hydrocarbon sensors.

3. The aircraft inspection system of claim 1, wherein the sample collector comprises a collection container in fluid communication with the one or more sensors.

4. The aircraft inspection system of claim 1, wherein the inspection robot further comprises a communication device that is configured to allow for wireless communication with one or more remote systems or devices.

5. The aircraft inspection system of claim 1, wherein the inspection robot further comprises a power source.

6. The aircraft inspection system of claim 1, wherein the inspection robot further comprises an inspection control unit operatively coupled to the conveying sub-system and the sensing sub-system, wherein the inspection control unit is configured to control operation of the conveying sub-system and the sensing sub-system.

7. The aircraft inspection system of claim 1, further comprising a docking station, wherein the inspection robot is configured to be deployed from and return to the docking station.

8. The aircraft inspection system of claim 7, wherein a power source of the inspection robot is configured to be recharged at the docking station.

9. The aircraft inspection system of claim 1, further comprising:
  a central database that stores reference data of the aircraft; and
  a monitoring control unit in communication with the central database, wherein the monitoring control unit is configured to receive the inspection data from the sensing sub-system and compare the inspection data with the reference data to determine a status of the one or more components of the aircraft.

10. The aircraft inspection system of claim 9, wherein the central database and the monitoring control unit are within a central monitoring station that is remote from the inspection robot.

11. The aircraft inspection system of claim 9, wherein the inspection robot comprises one or both of the central database and the monitoring control unit.

12. The aircraft inspection system of claim 1, wherein the one or more sensors comprises an infrared sensor that is configured to indicate a presence of water.

13. The aircraft inspection system of claim 1, wherein the sensing sub-system is further configured to determine weight of the aircraft.

14. The aircraft inspection system of claim 1, wherein the sensing sub-system is configured to determine alignment of a landing gear.

15. The aircraft inspection system of claim 1, wherein the inspection robot further comprises a navigation sub-system including one or more scanners, wherein the navigation sub-system is configured to navigate the inspection robot in relation to the aircraft and areas around the aircraft.

16. The aircraft inspection system of claim 15, wherein the one or more scanners are one or more light detection and ranging (LIDAR) sensors.

17. The aircraft inspection system of claim 15, wherein the one or more scanners are configured to detect locations of a plurality of landing gear of the aircraft, and wherein the navigation sub-system is configured to determine a location of the inspection robot in relation to the one or more components of the aircraft based on detected locations of the plurality of landing gear.

18. The aircraft inspection system of claim 15, wherein the one or more scanners are configured to detect signals emitted by one or more antennas of the aircraft or an airport, and wherein the navigation sub-system is configured to navigate the inspection robot based on the signals emitted by the one or more antennas of the aircraft or the airport.

19. The aircraft inspection system of claim 18, wherein the signals comprise one or more of surface movement radar (SMR), advanced surface movement guidance and control system (A-SMGCS), automatic dependent surveillance-broadcast/control (ADS-B, ADS-C), or aircraft communications addressing and reporting system (ACARS) signals.

20. An aircraft inspection method that is configured to inspect one or more components of an aircraft before a flight, the aircraft inspection method comprising:
  using an inspection robot to inspect the one or more components of the aircraft, wherein the using the inspection robot comprises:
    moving the inspection robot to different locations with a conveying sub-system;
    sensing one or more characteristics of the one or more components during an inspection with one or more sensors of a sensing sub-system that is one of on or within the inspection robot, wherein the sensing comprises determining one or both of balance of the aircraft or alignment of a landing gear of the aircraft;
    recording, by the sensing sub-system that is one or both of on or within the inspection robot, the one or more characteristics as inspection data; and
    collecting samples from the one or more components of the aircraft with a sample collector that is in fluid communication with the one or more sensors of the inspection robot.

21. The aircraft inspection method of claim 20, wherein the one or more sensors comprise one or more imaging devices, one or more optical sensors, one or more nondestructive inspection scanners, one or more luminescence sensors, one or more acoustic or radio frequency receivers, and one or more hydrocarbon sensors.

22. The aircraft inspection method of claim 20, further comprising fluidly connected to a collection container of the sample collector with the one or more sensors.

23. The aircraft inspection method of claim 20, wherein the using the inspection robot further comprises wirelessly communicating with one or more remote systems or devices.

24. The aircraft inspection method of claim 20, wherein the using the inspection robot further comprises providing power to the inspection robot through on a power source of the inspection robot.

25. The aircraft inspection method of claim 24, further comprising recharging the power source after the using the inspection robot.

26. The aircraft inspection method of claim 20, wherein the using the inspection robot further comprises operatively coupling an inspection control unit to the conveying sub-system and the sensing sub-system, and controlling operation of the conveying sub-system and the sensing sub-system with the inspection control unit.

27. The aircraft inspection method of claim 20, further comprising deploying the inspection robot from a docking station.

28. The aircraft inspection method of claim 27, further comprising recharging a power source of the inspection robot at the docking station.

29. The aircraft inspection method of claim 20, further comprising:
storing reference data of the aircraft in a central database;
communicatively coupling a monitoring control unit with the central database;
receiving the inspection data from the sensing sub-system; and
comparing the inspection data with the reference data to determine a status of the one or more components of the aircraft.

30. The aircraft inspection method of claim 29, further comprising disposing the central database and the monitoring control unit within a central monitoring station that is remote from the inspection robot.

31. The aircraft inspection method of claim 29, further comprising disposing one or both of the central database and the monitoring control unit within the inspection robot.

32. The aircraft inspection method of claim 20, wherein the sensing comprises using an infrared sensor to indicate a presence of water.

33. The aircraft inspection method of claim 20, wherein the sensing comprises determining the balance and weight of the aircraft.

34. The aircraft inspection method of claim 20, wherein the sensing comprises determining the alignment, tire status and pressure of a landing gear.

35. The aircraft inspection method of claim 20, wherein the using the inspection robot step further comprises:
providing a navigation sub-system including one or more scanners; and
navigating the inspection robot in relation to the aircraft and areas around the aircraft via the navigation sub-system.

36. The aircraft inspection method of claim 35, wherein the one or more scanners are one or more light detection and ranging (LIDAR) sensors.

37. The aircraft inspection method of claim 35, wherein the navigating comprises:
detecting locations of a plurality of landing gear of the aircraft; and
determining a location of the inspection robot in relation to the one or more components of the aircraft based on detected locations of the plurality of landing gear.

38. The aircraft inspection method of claim 35, wherein the navigating comprises:
detecting signals emitted by one or more antennas of the aircraft or an airport;
navigating the inspection robot based on the signals emitted by the one or more antennas of the aircraft or the airport.

39. The aircraft inspection method of claim 38, wherein the signals comprise one or more of surface movement radar (SMR), advanced surface movement guidance and control system (A-SMGCS), automatic dependent surveillance-broadcast/control (ADS-B, ADS-C), or aircraft communications addressing and reporting system (ACARS) signals.

40. An aircraft inspection system that is configured to inspect one or more components of an aircraft before a flight, the aircraft inspection system comprising:
an inspection robot that is configured to inspect the one or more component of the aircraft, wherein the inspection robot comprises:
a conveying sub-system that is configured to move the inspection robot to different locations;
a sensing sub-system that is one or both of on or within the inspection robot, the sensing sub-system including one or more sensors that are configured to sense one or more characteristics of the one or more components during an inspection, wherein the sensing sub-system, which is one or both of on or within the inspection robot, records the one or more characteristics as inspection data, wherein the sensing sub-system is configured to determine one or both of balance of the aircraft or alignment of a plurality of landing gear of the aircraft;
a sample collector that is configured to collect samples from the one or more components of the aircraft, wherein the sample collector comprises a collection container in fluid communication with the one or more sensors;
a communication device that is configured to allow for wireless communication with remote systems and devices;
a rechargeable power source;
a navigation sub-system including one or more scanners, wherein the navigation sub-system is configured to navigate the inspection robot in relation to an aircraft and areas around the aircraft; and
an inspection control unit operatively coupled to the conveying sub-system, the sensing sub-system, and the navigation sub-system;
a docking station, wherein the inspection robot is configured to be deployed from and return to the docking station, wherein the power source of the inspection robot is configured to be recharged at the docking station;
a central database that stores reference data of the aircraft; and
a monitoring control unit in communication with the central database, wherein the monitoring control unit is configured to receive the inspection data from the sensing sub-system and compare the inspection data with the reference data to determine a status of the one or more components of the aircraft.

41. The aircraft inspection system of claim 40, wherein the one or more sensors comprise one or more of one or more imaging devices, one or more optical sensors, one or more scanners, one or more luminescence sensors, and one or more hydrocarbon sensors.

42. The aircraft inspection system of claim 40, wherein the central database and the monitoring control unit are within a central monitoring station that is remote from the inspection robot.

43. The aircraft inspection system of claim 40, wherein the inspection robot comprises one or both of the central database and the monitoring control unit.

44. The aircraft inspection system of claim 40, wherein the one or more scanners are configured to detect locations of the plurality of landing gear of the aircraft, and wherein the navigation sub-system is configured to determine a location of the inspection robot in relation to the one or more components of the aircraft based on detected location of the plurality of landing gear.

45. The aircraft inspection system of claim 40, wherein the one or more scanners are configured to detect signals emitted by one or more antennas of the aircraft or an airport, and wherein the navigation sub-system is configured to navigate the inspection robot based on the signals emitted by the one or more antennas of the aircraft or the airport.

46. The aircraft inspection system of claim 45, wherein the signals comprise one or more of surface movement radar (SMR), advanced surface movement guidance and control system (A-SMGCS), automatic dependent surveillance-broadcast/control (ADS-B, ADS-C), or aircraft communications addressing and reporting system (ACARS) signals.

47. The aircraft inspection system of claim 1, wherein the one or more characteristics comprise an attribute related to one of a structural integrity, electrical integrity, hydraulic integrity, or chemical integrity of the one or more components.

48. The aircraft inspection system of claim 1, wherein the sensing sub-system is configured to detect distances between wing tips and ground to determine the balance.

49. The aircraft inspection system of claim 1, wherein the sensing sub-system is further configured to determine tire pressure of the landing gear.

* * * * *